UNITED STATES PATENT OFFICE.

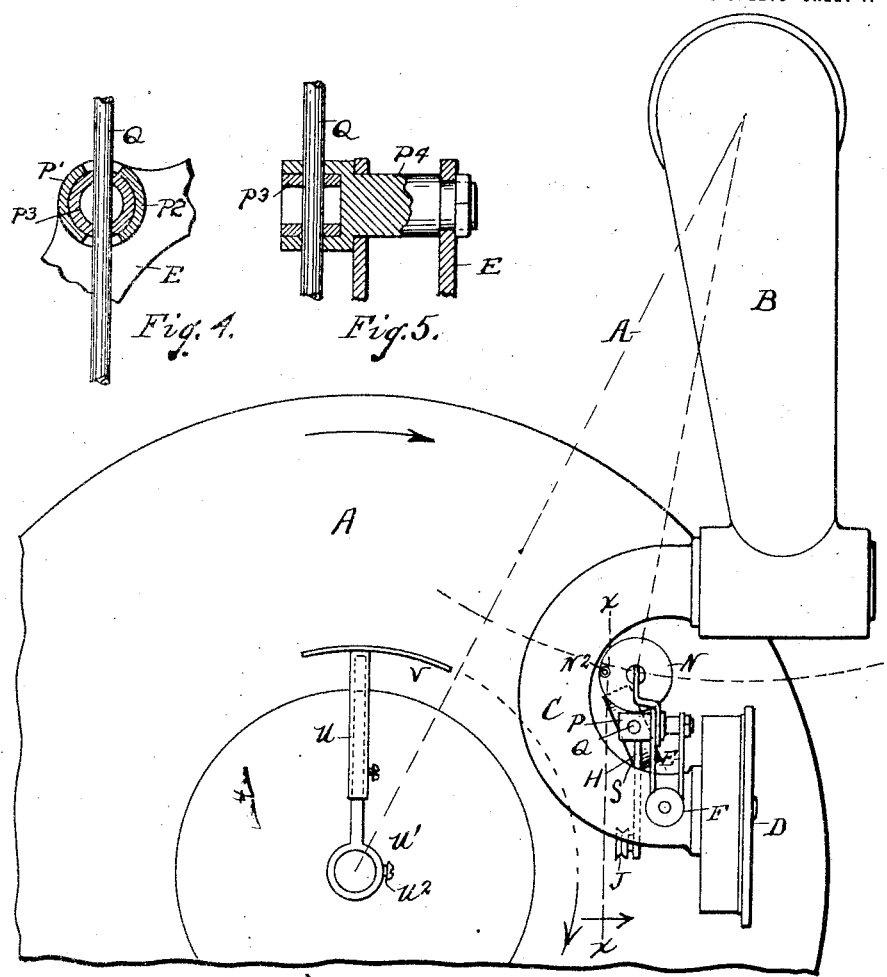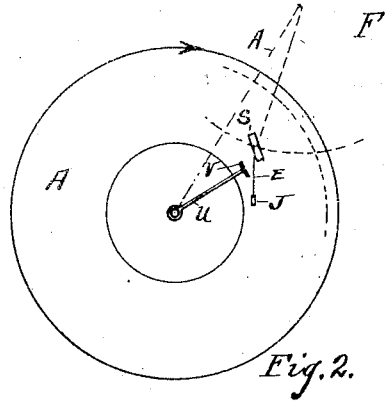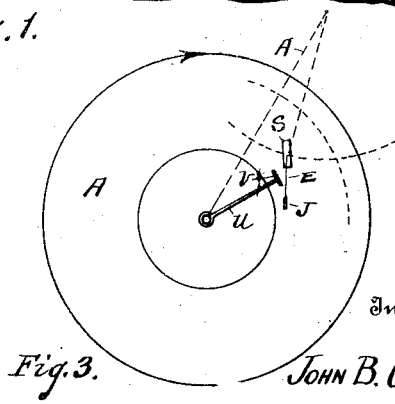

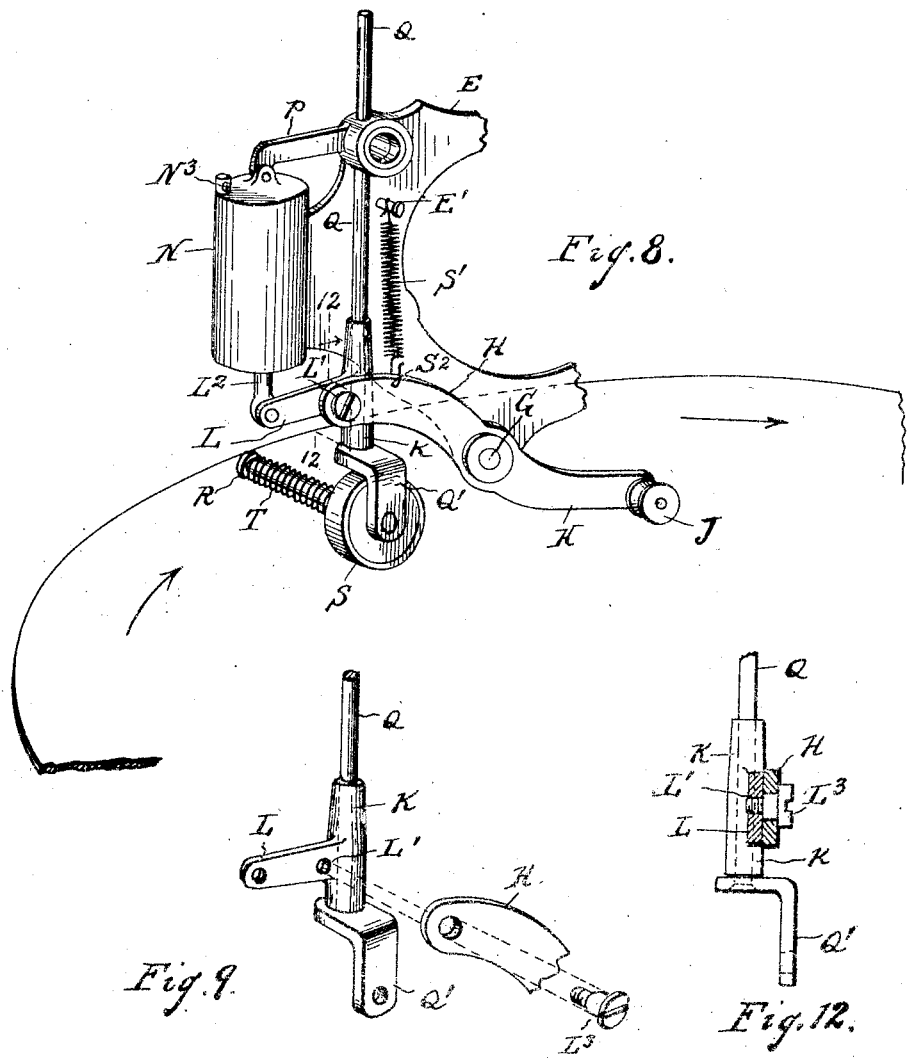

JOHN B. GRIFFIN, OF MAPLE HILL, CONNECTICUT.

PHONOGRAPH.

1,348,357. Specification of Letters Patent. Patented Aug. 3, 1920.

Application filed July 22, 1918. Serial No. 246,022.

*To all whom it may concern:*

Be it known that I, JOHN B. GRIFFIN, a citizen of the United States, residing at Maple Hill, county of Hartford, State of Connecticut, have invented a certain new and useful Improvement in Phonographs, and declare the following to be a full, clear, and exact description of the same, such as will enable others skilled in the art to which it pertains to make and use the same, reference being had to the accompanying drawings, which form a part of this specification.

My invention relates to phonographs. It has for its object the automatic repetition of certain portions of a record whether music, speech, or song or even a repetition of the entire record an indefinite number of times. It consists in the application of mechanism whereby such a record or such portion of a record may be repeated automatically at will in combination with the record and driving mechanism as hereinafter described.

In the drawings:

Figure 1 is a plan view of a portion of a record and means for automatically reproducing as stated.

Figs. 2 and 3 are diagrammatic views indicating how the amount of the record reproduced is determined.

Figs. 4 and 5 are sectional diagrams of a portion of the sustaining bar for holding the indicating roller and the means whereby it is allowed to oscillate, Fig. 5 is at right angles to that of Fig. 4.

Fig. 8 is a detail figure of the mechanism which controls the raising and lowering of the needle and is also a mechanism for shifting.

Fig. 9 is a detail of the joint mechanism separated so as to show the construction and operation thereof.

Fig. 12 is a section on the line 12—12 of Fig. 12.

Similar indices refer to similar parts.

Figure 6:
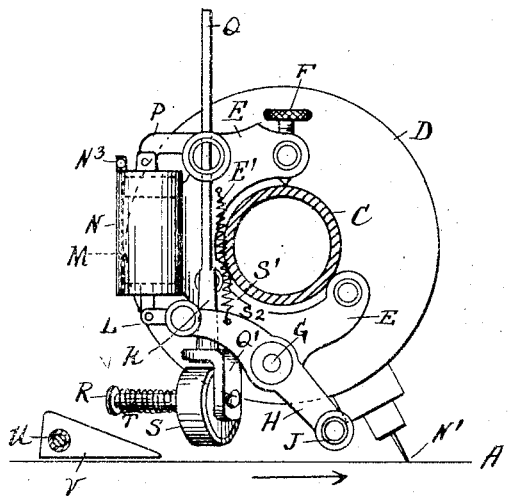
Fig. 6 is an elevation showing the repeating mechanism in its active position.
Figure 7:
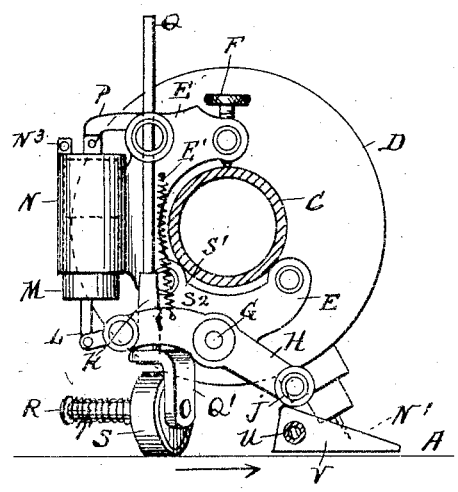
Fig. 7 is also the same figure except that the mechanism is shown in a position to begin the repeating action.
Figure 11:
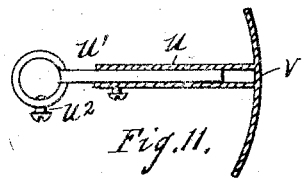
Figs. 10 and 11 are details of the extension trip mechanism.
Figure 10:
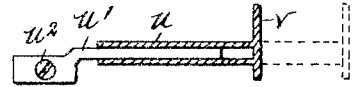

In the drawings A represents a record about which there is nothing new and which is supposed to revolve in the direction of the arrow. B is the arm which carries the needle which normally is in contact with the record to reproduce the sound. C is a gooseneck. D is a sound box. There is nothing new in the construction of the parts A, B, C and D and as their details form no part of my invention they need not be described. My device is attached to the goose-neck C by means of a clamp E fastened by a set-screw F. This clamp may be solid but is preferably made of two thin plates separated by studs and riveted together. The object of this is to make the device as light as possible but as it involves no principle of construction and might as well be solid, it is not necessary to describe it further. Mounted on this clamp at G is a rock-arm H. This rock-arm is rotatable on its pivot G with a certain range of motion. At one end is a small grooved roller J and at the other end there is a vertical bearing K shown in Figs. 6 and 7, carrying an arm L upon which is mounted a piston M sliding in an air dashpot N. The upper end of this dashpot is fastened to and carried by an arm P which is also attached to the bracket E. The arm P carries a rotatable bearing as shown in section Figs. 4 and 5 and through which slides a rod Q. This bearing is numbered $P^3$ and is carried by a bolt $P^4$ which is slotted forming lips $p'$ $p^2$ and hollowed out at the end to receive bearing $P^3$ which is permitted to oscillate therein. The lower end of the rod Q is rotatably and also slidably engaged in a bearing K and carries an angular offset $Q^1$. This bearing K carries an arm L which in turn is pivoted to the arm H at L'. This is shown in detail in Figs. 9 and 12, Fig. 9 showing the parts dissected. This rotatable joint at L' is made up of a stud $L^3$ which passes rotatably through the end of the arm H and screws into the arm L attached to the bearing K. The arm L is attached to the piston rod $L^2$ which carries piston M shown in dotted lines in Fig. 6. At its extreme lower end the offset $Q^1$ has fixedly attached to it an axle R. This axle carries a small roller S made preferably of rubber. The roller S is pressed up against the bracket $Q^1$ by means of the spring T. It will be seen that by this means the roller S can be set at different angles by rotating the shaft Q and that it may be elevated or lowered by means of the rock-arm H. The roller S is normally held in the position shown in Fig. 6 where the needle N' is shown as operating upon the surface of the record A in the usual manner and therefore effecting the proper result in such mechanism. In order to hold it in this position I have shown a weak spiral spring S' which is hooked into the rock-arm H at S² and also into the bracket E at E'. This creates a slight tension sufficient to hold the rock-arm H together with the roller S in the position off from the record in the position shown in Fig. 6. It will be understood that the shaft Q is longitudinally fixed but rotatable in the bearing in the bracket K. At the top of the air dashpot is an adjusting valve N³ for regulating the flow of air. In order to actuate the rock-arm H and bring the roller S in contact with the surface of the record and lift the needle therefrom, as shown in Fig. 7, I provide a telescopic arm U fastened to the axle of the record at U'. At the end of this telescoping arm is a triangular wedge shaped incline piece V having a curvature that will substantially correspond to the curvature of the record. Preferably the upper edge of this incline V is made in a knife edge form whereby it engages as the record rotates and when the swinging arm with its needle in its spiral convolutions has reached the position of the incline V it engages the roller upon the incline raising that end of the rock-arm H and brings the roller S down upon the record as it passes the apex of the triangular piece V. As the roller J rides up over the triangular piece V rocker arm H is actuated about point G lifting the sound box and needle off the record, this brings the rearward end of the rocker arm H downward bringing roller S into contact with the surface of the record. The setting of the roller at an angle opening outward from the tangent of a radius from the center of the record through the axis of the roller will, while the roller is in contact with the record, compel the needle of the goose-neck to travel outwardly without having the needle in contact with the record to such a distance as the angle of the roller with the tangent permits and while it is in contact with the record. This can be adjusted so as to carry the needle to the extreme edge of the record to begin the operation over again, in other words, repeat whatever the record is designed to give. On the other hand, it may be set so slightly or to such an angle as to shift the needle to afford a repetition of any portion of the record. The spiral spring S' during this time is exerting an upward force tending to draw roller S off the record. This action of spiral spring S however is delayed by the slow escape of air from the dashpot through adjustable valve N³. The rate of escape of air from the dashpot consequently measures the time the roller is in contact with the record, and may be adjusted so as to make the contact merely momentary or prolong it at will.

The sound box may be lifted and placed upon the record manually in the beginning of the operation.

It will be seen that this arrangement and mechanism is adapted to be applied to many of the phonographs that are already in use. The telescopic arm U is easily fastened to the axle on which the record turns by placing it over it and turning up the set-screw at U² thereby compelling the piece V to travel with the record. The telescopic arm U with the piece V may be set at any reasonable distance from the center of the record so that the repetition will occur at any point in the record.

In the drawings Figs. 2 and 3, I have shown how the roller will act while in contact with the record in its rotation under it. In Fig. 3 the roller is set at an angle to rapidly throw the arm B to which it is attached out to the extremity of the record whereas in Fig. 2 the angle being less would show that the roller would not throw it out so far, this angle corresponding to an adjustment made by the roller support Q.

The operation of these devices in general will be sufficiently understood from the foregoing description.

What I claim is:

1. In combination with a phonograph reproducer, a detachable clamp adapted to be attached to the gooseneck of a phonograph reproducer arm, a perpendicular rod carried thereby vertically movable therein, a roller carried at the lower extremity of said rod, means for automatically bringing the roller into contact with the surface of the record, means for adjusting the roller so it will travel outward on the record any desired distance, and means for automatically lifting it therefrom.

2. In a phonograph repeating device, in combination with a detachable clamp adapted to be attached to a phonograph reproducer arm, a bearing carried by said detachable clamp, a vertical rod mounted in said bearing longitudinally slidable therein and rotatably adjustable, a resilient roller carried at the lower extremity of said rod, mechanism for automatically bringing said roller into contact with the surface of the record coincident with the lifting of the needle therefrom, and mechanism for automatically lifting said roller from the surface of the record coincident with the lowering of the needle into contact with the surface of the record, substantially as described.

3. In combination with a phonograph reproducer, a detachable clamp adapted to be attached to the gooseneck of the reproducer arm, a vertical bearing carried thereby, a rod slidably mounted in said bearing rotatable therein, a roller carried at the lower extremity of said rod, mechanism for automatically bringing said roller into contact with the surface of the record, and mechanism for automatically lifting said roller from the surface of the record at any desired position.

4. In a detachable clamp adapted to be attached to the gooseneck of a phonograph reproducer arm, a vertical bearing carried thereby, a rod slidably mounted in said bearing and rotatable therein, an offset extension on the lower extremity of said rod, a resilient roller mounted on a horizontal axis carried at the lower end of said offset extension; said rod, offset extension and roller carried thereby rotatable about the longitudinal axis of said vertical rod in said bearing.

5. In a detachable clamp adapted to be attached to a phonograph reproducer arm, a vertical bearing mounted thereon, a lever horizontally mounted thereon, a vertical bearing carried by said lever and in perpendicular alinement with the other vertical bearing, a rod slidably disposed in said bearings, an offset extension on the lower extremity of said rod, a resilient roller mounted on a horizontal axis carried by said offset extension, said rod being rotatable about its longitudinal vertical axis within said bearings, means for automatically lowering said rod bringing the roller into contact with the surface of the record, means for automatically elevating said rod withdrawing the roller from contact with the surface of the record substantially as described.

6. In a detachable clamp adapted to be attached to a phonograph reproducer arm, a vertical bearing mounted thereon, a lever horizontally mounted thereon, a vertical bearing carried by said lever and in perpendicular alinement with the other vertical bearing, a rod slidably disposed in said bearings, an offset extension on the lower extremity of said rod, a resilient roller mounted on a horizontal axis carried by said offset extension, means for automatically lowering said rod bringing the roller into contact with the surface of the record, means for adjusting the roller so it will be carried outward by the revolution of the record any desired distance thereon.

7. In a detachable clamp adapted to be attached to a phonograph reproducer arm, a vertical bearing mounted thereon, a lever mounted thereon, a vertical bearing carried by said lever and in perpendicular alinement with the other vertical bearing, a rod slidably disposed in said bearings, an offset extension on the lower extremity of said rod, a resilient roller mounted on a horizontal axis carried by said offset extension, said rod being rotatably disposed about its longitudinal vertical axis within said bearings, means for automatically lowering said rod bringing the roller into contact with the surface of the record, means for automatically elevating said rod withdrawing the roller from contact with the surface of the record, substantially as described.

8. In a detachable clamp adapted to be attached to a phonograph reproducer arm, a vertical bearing mounted thereon, a lever mounted on a horizontal axis carried thereby, a vertical bearing carried by said lever and in perpendicular alinement with the other vertical bearing, a rod disposed in said bearings vertically movable therein, a resilient roller mounted on a horizontal axis carried by an offset extension at the lower extremity of said rod, said rod being rotatably disposed about its longitudinal vertical axis within said bearings, mechanism for automatically depressing the end of said lever on which is mounted the vertical bearing bringing the roller into contact with the surface of the record, a spring under constant tension when said lever is depressed tending to lift the same upward and withdraw the roller from the record, means for automatically retarding the action of spring.

9. In a repeating mechanism for a phonograph, an adjustable telescopic arm carried by and rotatable with the axle of the record, a triangular wedge shaped tripping head curved to substantially conform to the grooves of the record carried at the outer extremity of said telescopic arm, a lever fitted with a grooved roller mounted on a horizontal axis adapted to ride up over said wedge shaped tripping head mounted on a detachable clamp which is adapted to be attached to the reproducer arm of the phonograph, a resilient roller carried by a vertically disposed slidable rod rotatable about its vertical axis adapted to be actuated into contact with the surface of the record coincident with the riding of said grooved roller over said tripping head, and mechanism for automatically elevating said rod and roller.

10. In a repeating mechanism for a phonograph an adjustable telescopic arm carried by and rotatable with the axle of the record, a triangular wedge shaped tripping head curved to substantially conform to the grooves of the record carried at the outer extremity of said telescopic arm, a horizontally mounted lever on a detachable clamp adapted to be attached to the gooseneck of the reproducer arm, a grooved roller carried at one end of said lever adapted to automatically engage said tripping head, a resilient roller adapted to be actuated into contact with the surface of the record by the other end of said lever coincident therewith.

11. In a repeating mechanism for a phonograph, an adjustable telescopic arm carried by and rotatable with the axle of the record, a tripping head carried at the outer extremity of said arm, a horizontally-mounted lever carried by a detachable clamp attached to the goose-neck of the reproducer arm, a grooved roller carried by one arm of said lever, adapted to automatically engage said tripping head, a roller adapted to be actuated into contact with the surface of the record by the constant downward movement of the opposite end of the lever from that of the grooved roller, a spring tensioned against such downward movement connecting said lever to the detachable clamp.

12. In a phonograph, in combination with the reproducer arm, a roller mounted on a horizontal axis carried thereby, means for automatically bringing said roller into contact with the surface of the record coincident with the lifting of the needle therefrom, means for adjusting the angle of the axis of said roller with the radius of the record.

13. In a phonograph, a tripping device detachably mounted on the axle of the record and rotatable therewith, a roller mounted on a horizontal axis carried by the reproducer arm and adapted to support the same when the needle is lifted from the record, means for automatically lifting said needle from the surface of the record by engagement of said means with the tripping device, means for adjusting the angle of said roller so it will travel outward on the surface of the record any desired distance.

In testimony whereof, I sign this specification.

JOHN B. GRIFFIN.